United States Patent Office 3,373,216
Patented Mar. 12, 1968

3,373,216
PREPARATION OF POLYALKENYL AROMATIC HYDROCARBONS FROM AROMATIC HYDROCARBONS AND DIOLEFINS
Erik Tornqvist, Roselle, Union, N.J., assignor to Esso Research and Engineering Company, a corporation of Delaware
No Drawing. Filed Dec. 2, 1965, Ser. No. 511,228
10 Claims. (Cl. 260—668)

The present invention relates to a method for the preparation of polyalkenyl-aromatic polymers. More particularly, the invention is directed to a chromium-based catalytic method for the preparation of polymers of diolefins and aromatic compounds.

Various diolefin polymers have been prepared in the past with chromium-based catalysts in the presence of aromatic compounds. For example, Natta et al. in La Chim. Ind. 41, 526 (1959) and ibid. 41, 1163 (1959) reported contacting butadiene with a catalyst system containing a chromium compound and an alkyl metal compound in the presence of an aromatic diluent. The products obtained were high molecular weight polybutadienes, particularly polybutadienes with a high degree of 1,2-addition. At an even earlier date, Wilke (Angew. Chem., 69, 397 (1957) and J. Polymer Sci., 38, 45 (1959)) reported the formation of interesting oligomers, primarily cyclic dimers and trimers from butadiene, isoprene and piperylene by employing catalysts containing either a titanium or a chromium compound in combination with a suitable alkyl metal compound. More specifically, good yields of 1,5,9-cyclododecatriene containing about 60% of the tr., tr., isomer and 40% of the tr., tr., cis isomer were reported when butadiene was contacted with catalyst systems containing chromium compounds ($CrO_2Cl_3$ or $CrCl_3$ with triethyl aluminum).

Now, in accordance with this invention, it has been discovered that relatively low molecular weight polymeric substances having the general formula:

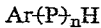

wherein Ar is a phenyl radical, a $C_1$ to $C_4$ alkyl substituted phenyl radical, or a tetrahydronaphthyl radical; $(P)_n$ is a poly acylic diene composed of repeat units P of the general formula:

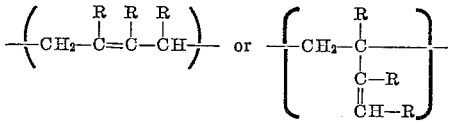

and mixtures thereof, wherein R represents a hydrogen or methyl radical and may be the same or a different moiety; and $n$ is an integer varying from 2 to 25, can be prepared by polymerizing diolefins in a mononuclear aromatic diluent or tetralin with a catalyst mixture made up of a chromium halide and a weakly reducing alkyl metal compound. The reaction is suitably conducted at moderate polymerization temperatures and pressures. The products of this invention are useful for a wide variety of applications, such as in the preparation of surface coatings, glass fiber reinforced plastics, laminated articles, intermediates for detergents and flotation agents, etc.

The polymers encompassed by the present invention are telomers formed from diolefins and mononuclear aromatic compounds and tetralin. Preferably, the diolefin monomers used are straight or branched chain conjugated diolefins having 4 to 6 carbon atoms. Representative examples of useful diolefins include 1,3-butadiene, 2,3-dimethyl butadiene, isoprene and piperylene.

The second component of the polymer system is preferably an unsubstituted or $C_1$ to $C_4$ alkyl substituted mononuclear aromatic compound or tetralin. Examples of useful aromatic compounds include benzene, toluene, ortho-, meta- and paraxylene, ethylbenzene, diethylbenzene, tetrahydronapthalene (Tetralin), etc. The present polymerization process is preferably carried out without the use of an inert diluent, since the mononuclear aromatic compound may most advantageously serve as a solvent for the diolefin monomer. The aromatic compounds used as comonomer in the polymerization should therefore be liquid at the conditions of temperature and pressure used in the polymerization reaction.

The catalyst system employed in preparing the polymers of this invention comprise a two component system made up of a chromium halide, preferably a chromic halide, and a weakly reducing metal alkyl compound. Useful chromium compounds include $CrCl_3$, $CrBr_3$, $CrO_2Cl_2$, $CrO_2Br_2$, $CrCl_2$, etc. Useful metal alkyl compounds include zinc alkyl compounds, lithium aluminum alkyl compounds, alkyl aluminum halide compounds, etc. Particularly valuable cocatalysts are the lower alkyl aluminum compounds, especially monoalkyl aluminum dihalides whose alkyl group contains from 1 to 6 carbon atoms. Representative nonlimiting examples of the preferred cocatalyst compounds include methyl aluminum dichloride, ethyl aluminum dichloride, ethyl aluminum dibromide, ethyl aluminum diiodide, ethyl aluminum difluoride, propyl aluminum dichloride, butyl aluminum dibromide, etc. The preferred cocatalyst may be used alone or in combination with minor amounts of the corresponding dialkyl aluminum halide compound, for example, mixtures of ethyl aluminum dichloride and diethyl aluminum chloride may be used in the formation of polymers of this invention. Dialkyl aluminum halides are effective cocatalysts; however, considerably smaller product yields are secured than when alkyl aluminum dihalides are used.

The molar ratio of chromium compound to cocatalyst is not particularly critical as long as sufficient cocatalyst is present. Chromium compound to cocatalyst molar ratios can vary in the range from about 0.05:1 to 3:1, preferably from about 0.2:1 to 1:1. The total amount of catalyst employed in the polymerization reaction varies with the choice of components of the catalyst system and with the types of monomer polymerized, but it is generally in the range from about 0.05 to 10 grams, preferably 0.2 to 4 grams, of total catalyst per liter of mononuclear aromatic compound and from 0.5 to 50 grams, preferably from 2 to 40 grams per kilogram of diolefin.

The conditions at which the polymerization reaction is conducted can vary over a wide range. Generally, temperatures ranging from about 25 to 120° C. can be used; however, temperatures ranging from 45 to 80° C. are preferred. The pressure at which the polymerization is carried out is not critical and pressures ranging from 0.5 to 10 atmospheres, preferably from 1 to 5 atmospheres, can be used. In most industrial applications, the pressure within the polymerization reaction zone will normally be the autogenous pressure exerted by the reactants, e.g., the diolefin and the mononuclear aromatic compound. The reaction time used in the formation of the preferred polymers of this invention is not critical; however, sufficient time should be allowed for the desired monomer conversion which depends upon temperature, monomer concentration, activity of the particular catalyst combination used, etc. In general, high yields of the polyalkenyl aromatic products of this invention are obtained within the temperature and pressure limits set forth above within from 1 to 300 hours.

The reaction vessel used for the polymerization reaction can be constructed of any material that is inert to the reactants and catalyst used and is capable of withstanding the operating pressures. Reaction vessels made of glass, stainless steel and glass-lined steel are satisfactory.

In a typical polymerization procedure according to this invention, the liquid mononuclear aromatic compound involved in the telomerization reaction, is charged to a dry stirred reactor. The alkyl metal cocatalyst is first added to the reactor followed by the chromium halide. After thorough mixing of the contents, dry diene monomer is introduced to the reactor.

The polymerization reactor under constant stirring is then brought to the desired polymerization temperature and the reaction allowed to continue for the time needed to achieve substantial conversion of the diene to the desired polyalkenyl aromatic material. The polymerization is then terminated by the addition of an alkanol, suitably isopropanol containing about 0.5 gram of phenyl beta-naphthylamine (PBN). The alcohol addition causes decomposition and solubilization of the catalyst and thus terminates the reaction, and also serves to precipitate any undesirable high molecular weight polydiene products formed in the reaction, which can then be filtered off. Since the alcohol addition is not intended to cause precipitation of the polyalkenyl aromatics of an intermediate molecular weight, i.e., primarily in the molecular weight range of about 250 to 3000, the amount of alcohol added should be kept below the level at which such precipitation occurs. When benzene is used as the aromatic comonomer and isopropanol as the precipitating alcohol, addition of about two volumes of alcohol for each volume of benzene is usually satisfactory for precipitating all higher molecular weight material while retaining the desired polyalkenyl aromatics in solution. In the preferred cases in which little or no high molecular weight polymer is formed, the amount of alcohol added need of course only be sufficient to cause decomposition of the catalyst.

When the catalyst has been properly deactivated and solubilized, and any high molecular weight polymer present has been precipitated, the polyalkenyl aromatics are suitably recovered by first filtering off the high molecular weight polymer and other insoluble material and then distilling the mixture to remove the alcohol, unreacted aromatic compound and diene monomer. The polyalkenyl aromatic mixture obtained as distillation bottoms is in the form of a light yellowish colored viscous liquid. Since the color is primarily caused by the PBN oxidation inhibitor, an almost colorless product may be obtained by removing this inhibitor or by using another, essentially colorless, inhibitor.

The generalized formula $Ar(P)_nH$ should not be taken as a statement that the first diene unit is attached to the mononuclear aromatic compound through its first carbon atom, nor that the polydiene chains are formed exclusively by 1,4-type addition. It is known from the art of stereoselective polymerization of conjugated dienes, butadiene and isoprene in particular, that even the most stereoselective polymerization presently known, e.g., the reactions forming cis-1,4-polybutadiene, trans-1,4-polybutadiene and cis-1,4-polyisoprene, always lead to a small amount of irregular monomer addition, usually in the order of at least 2 to 4% of the total. Thus, the most stereospecific catalysts presently known for making cis-1,4-polybutadiene always produce both some trans-1,4 and some 1,2 addition. Naturally, in the case of the catalysts of this invention, which are not particularly claimed for their ability to form diene chains of a highly stereoregular nature, the diene addition to the mononuclear aromatic compound may take place occasionally through the second or third carbon atoms of the diene, e.g., in the case of butadiene and benzene to yield a product having the configuration

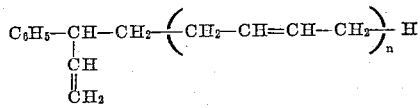

In an analogous manner, a significant amount, in the order of 5 to 10%, of 1,2 or 3,4 addition may take place during the reaction leading to the formation of polyalkenyl chains, which in the case of butadiene would give structural segments such as

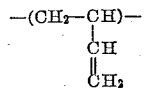

Although nothing is known with certainty about the mechanism by which the polyalkenyl aromatics are formed according to the invention, the data presented in Example 1 indicate a possible mechanism which may largely explain the type of product obtained.

Obviously, the formation of polyalkenyl chains of moderate length requires oligomerization of the diene. It can be calculated that the highest yields reported in Table I require the formation of several such chains per chromium atom. Thus, the 90 grams of polymer of an average molecular weight of 548 formed in Example 1, Run 2, with 2.5 millimoles of $CbBr_3$ results in a catalyst efficiency of 65.5 moles of polymer per mole $CrBr_3$. This suggests a polymerization with frequent termination by the diluent according to Equations 1 and 2.

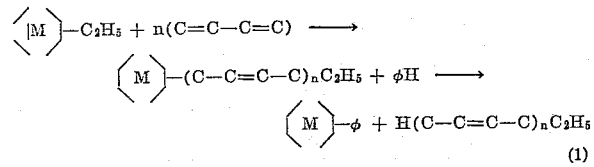

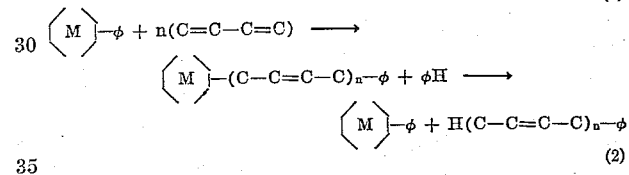

Of these equations, the first one represents the initial step involving an ethyl group (from $AlEtX_2$) attached to the active metal-containing site, $\left(\!\!\begin{array}{c}\diagup\\ M\\ \diagdown\end{array}\!\!\right)$, while the second one represents repeated termination by benzene in such a manner that the active site is regenerated. In a way, this can be looked upon as an electrophilic attack on the benzene by the positively charged metal of the active site.

Although a small amount of low molecular weight polybutadiene containing one terminal ethyl-group per molecule is formed according to Equation 1, this amount is insignificant in comparison with the large amounts of polyalkenyl aromatics subsequently formed according to Equation 2.

Because of the many polyalkenyl benzene molecules formed per mole of initiator, this mechanism should yield a molecular weight distribution similar to that obtained under steady state conditions in radical-chain polymerizations, i.e., the mole fractions of two consecutive polymers of the degrees of polymerization $n$ and $n+1$, respectively, should follow the relationship $$\frac{X_{n+1}}{X_n} = \frac{\overline{DP}}{\overline{DP}+1} \qquad (3)$$

where $\overline{DP}$ is the average degree of polymerization of the product, and $X_n$ is the mole fraction of the polymer of the degree of polymerization $n$.

Inspection of the mole fractions reported in Table III reveals that they decrease monotonically with increasing degree of polymerization in a manner similar to that expected from the above mechanism.

Polymerization and regenerative termination with diluent involving a nonstereospecific complex anionic catalyst according to Equation 2 would also explain the formation of polyalkenyl chains in which the monomer units have been incorporated by trans-1,4; cis-1,4; and 1,2 addition. However, it should be re-emphasized that nothing is known with certainty about the mechanism by which the products of this invention are formed, and it should be clearly understood that the above mechanism has been forwarded primarily to illustrate the character of the main product formed in the reaction.

Actually, the analytical data obtained on the product of Example I, Run 2, may suggest a cationic mechanism, inasmuch as the formation of polyalkenyl benzenes containing two benzene rings would be readily explained on the basis of such a mechanism. On the other hand, these compounds containing two benzene rings may have been formed through a secondary reaction when the sample was heated to 150° C. during the distillations or to about 250° C. in the mass spectrometer.

The polymer products of this invention obtained according to the above-described process exhibit number average molecular weights varying from about 300 to 3000 as determined by vapor pressure osmometry. The polymers produced are liquids at normal temperatures and are highly unsaturated exhibiting iodine numbers (e.g., I/gram of polymer) varying from about 250 to 500. Depending upon the type of diolefin used, the ultimate polymer produced may contain from 2 to 20% of Type I unsaturation, from 35 to 80% of Type II trans unsaturation and from 25 to 60% of Type II cis unsaturation as calculated from the infrared absorption peaks at 11µ (Type I), 10.35µ (Type II Trans), and 13.5µ (Type II Cis) measured on a filtered 1 percent (mol./vol.) solution of polymer in carbon disulfide. It should be noted, however, that interference from the monoalkylated benzene peak makes it difficult to determine the Type II cis unsaturation accurately. The value calculated for the cis unsaturation in any particular case will therefore normally represent a maximum and may in reality be somewhat lower. The polyalkenyl aromatics are generally soluble at room temperature in hydrocarbon solvents, chlorinated hydrocarbons and other solvents, such as higher alkanols, that are normally useful for dissolving hydrocarbon oils.

The polyalkenyl aromatics of this invention have many varied uses because of the types of unsaturation contained in both the alkenyl and the aromatic functionality of the polymer. The polymers may be used for making thermosetting resins, surface coatings, epoxides, etc. The ability of the polymer to crosslink because of the numerous types of unsaturation is of obvious commercial significance. The polymers may also be used in the manufacture of surface active and flotation agents through the introduction of polar functionality into the polymer structure.

This invention and its advantages will be better understood by reference to the following examples:

EXAMPLE 1

A series of experiments involving 1,3-butadiene and benzene were carried out with chromic bromide based catalysts. The general procedure was as follows:

A quart size pressure bottle was oven dried at 110° C. and transferred hot to a nitrogen containing dry box. After it had been flushed with dry nitrogen while still hot and subsequently cooled, the bottle was charged with 500 ml. dry benzene. The alkyl metal component of the catalyst was then added, followed by the chromic bromide. After thorough mixing of the contents, 100 grams of liquid 1,3-butadiene (dried with Drierite and $CaCl_2$ in the gas phase) were added with thorough mixing. The bottle was then transferred to a paddle wheel stirrer submerged in a temperature controlled water bath.

The polymerization was terminated after the desired period of time by pouring the contents of the bottle into one liter of dry isopropanol containing 0.5 gram PBN. The mixture was then allowed to stand at room temperature for 24 to 48 hours to insure complete reaction between the catalyst components and the alcohol as well as complete precipitation of any high molecular weight polymer present.

After any insoluble material had been filtered off, the liquid mixture was treated with an equal amount of distilled water in a separatory funnel to remove the isopropanol. After withdrawal of the heavy alcohol-containing aqueous phase, the organic phase was extracted twice more with 1½ volumes of distilled water. The organic phase was then analyzed by gas chromatography (150 ft. polypropylene glycol succinate coated capillary column installed in an IDS Model 20 chromatograph operated at 175° C.) to establish the presence of dimers and trimers of the diene monomer as well as of other equally volatile products. The liquid mixture was then stripped of benzene and traces of isopropanol at atmospheric pressure with the help of a spinning band column at a reflux TABLE I.—BUTADIENE POLYMERIZATION WITH $CrBr_3$ CONTAINING CATALYSTS

[1 liter soda king bottles on paddle wheel stirrer; 100 g. 1,3-butadiene, 500 ml. benzene]

| Run | 1 | 2 | 3 | 4 | 5 | 6 |
|---|---|---|---|---|---|---|
| Catalyst: | | | | | | |
| $CrBr_3$, g.[a] | [b] 0.73 | 0.73 | 0.73 | 0.73 | 0.73 | 0 |
| Aluminum Alkyl: | | | | | | |
| Type | AlEtCl$_2$ | AlEtCl$_2$ | AlEt$_2$Cl | AlEt$_2$Cl | AlEt$_3$ | AlEt$_3$ |
| Weight g | 0.635 | 0.95 | 0.603 | 0.904 | 0.86 | 0.89 |
| Al/Cr Molar Ratio | 2 | 3 | 2 | 3 | 3 | 3 |
| Reaction Conditions: | | | | | | |
| Temperature °C | 55 | 50 | 55 | 50 | 50 | 50 |
| Run Length, hrs | 24 | 72 | 24 | 72 | 24 | 72 |
| Results: | | | | | | |
| Total Yield of Products, g | 85.4 | 90.0 | 12.0 | 50.6 | 23.2 | 44.3 |
| Insoluble Products, [c] g | 0 | 0 | 0.5 | 0 | 0.7 | 1.2 |
| Dimers and Trimers, g | [d] 1.1 | | | [d] 1.6 | [e] 12.0 | [e] 28.1 |
| Distillation Bottoms, g | [f] 84.3 | [f] 90.0 | [f] 11.5 | [f] 49.0 | 10.5 | 15.0 |
| Analyses on Products: | | | | | | |
| Trimers: | | | | | | |
| Tr., tr., tr.-Cyclododecatriene, percent [g] | | | | | 56.6 | 63.8 |
| Distillation Bottoms: | | | | | | |
| Molecular Weight [h] | | 548 | | 585 | | |
| Unsaturation, percent of total [i]: | | | | | | |
| Type I | 6.6 | 5.3 | 7.7 | | | |
| Type II, Trans | 53.0 | 36.3 | 59.2 | | | |
| Type IV, Cis [j] | 40.4 | 58.4 | 33.1 | | | |

[a] Prepared by halogen exchange between HBr and $CrCl_3$ in liquid $AlBr_3$ at 247° C. according to the process described in copending patent application Serial No. 145,745. Ball milled 6 days.
[b] Corresponds to 2.5 mmoles $CrBr_3$.
[c] After addition of 2 vol. isopropanol. As indicated by its color, this fraction, when present, consisted probably primarily of chromium organic compounds.
[d] Consisted primarily of monoalkylated benzene as indicated by the strong MS parent peak at mass number 132.
[e] Almost exclusively a mixture of 1,5,9-cyclododecatrienes.
[f] Primarily consisting of monoalkylated benzenes, $\phi(CH_2-CH=CH-CH_2)_nH$, as indicated by mass spectrographic and infrared analyses.
[g] As determined by gas chromatographic analysis employing a 150 ft. polypropylene glycol succinate coated capillary column installed in an IDS Model 20 chromatograph operated at 175° C.
[h] Number average molecular weight determined with a vapor pressure osmometer.
[i] Determined from the IR absorption peaks at 11µ (Type I), 10.35µ (Type 11 Trans), and 13.5µ (Type II Cis) as measured on a 1 percent (wt./vol.) solution of polymer in $CS_2$.
[j] Because of interference from monoalkylated benzene, the cis concentration could not be determined accurately. The value given represents a maximum.

ratio of 3/1. The stripped residues were then distilled in a microapparatus at about 0.1 mm. Hg until the pot temperature reached 150° C. Under these conditions, butadiene dimers and residual benzene were collected in a Dry Ice trap, while the trimers (cyclododecatrienes), which boiled at about 42° C., and codimers of benzene and butadiene, were collected in a wet ice cooled receiver. The nonvolatile polyalkenyl benzenes, when present, were then obtained as the distillation bottoms.

The data presented in Table I clearly show that $CrBr_3$—$AlEtCl_2$ catalysts very selectively produce good yields of polyalkenyl benzenes. Catalysts obtained by combining $CrBr_3$ with $AlEt_2Cl$ also exhibit good selectivity toward the formation of polyalkenyl benzenes, but at a lower efficiency than the $AlEtCl_2$ based catalysts. Catalysts made by combining $CrBr_3$ with $AlEt_3$, on the other hand, yield primarily butadiene trimers, usually a mixture of 1,5,9-cyclo-dodecatriene containing about 60 to 65% of the all-trans form.

The identification of the distillation bottoms obtained in Runs 1 to 4 as being polyalkenyl aromatics was made primarily with the help of infrared and mass spectrometric (M.S.) analyses. The infrared analyses, which were carried out according to known methods, demonstrated the presence of monosubstituted aromatic rings as well as of vinyl and Type II cis and trans unsaturation. The M.S. analyses demonstrated more specifically that the products consisted primarily of polyalkenyl aromatics. These analyses involved a rather complicated procedure which is best described as applied to the distillation bottoms of Run 2.

The M.S. analysis was carried out on the distillation bottoms of Run 2 both before and after hydrogenation. In either case a small sample, about 2 mg., was introduced into the sample chamber and heated to 248° C. at about $10^{-2}$ mm. Hg. From the low voltage (7 v.) spectra it could be concluded that the sample consisted of two dominant series of products as shown in Table II.

TABLE II.—SUMMARY OF MASS SPECTROMETRIC ANALYSIS OF THE DISTILLATION BOTTOMS FROM RUN 2

Fraction: Amount
1. Not volatile at 248° C. and approximately $10^{-2}$ mm. Hg _____ 65%.
2. Polyalkenyl benzenes ($n=1$–$8$) $\phi(CH_2$—$CH$=$CH$—$CH_2)_nH$ _____ Major volatile fraction.
3. Polyalkenyl dibenzenes ($m=0$–$6$) $\phi_2 \cdot C_4H_8(CH_2$—$CH$=$CH$—$CH_2)_m$—— Significant component.
4. Compound of mass 219 _____ Minor.

The dominant M.S. peaks of the original sample are shown in Table III.

TABLE III.—DOMINANT M.S. PEAKS IN DISTILLATION BOTTOMS FROM RUN 2

| Series No. 1 | | | | Series No. 2 | | | |
|---|---|---|---|---|---|---|---|
| $C_yH_{2y-x}$° | | m/e* | Peak Heights | $C_yH_{2y-x}$° | | m/e* | Peak Heights |
| y | x | | | y | x | | |
| 10 | 8 | 132 | 100 | | | | |
| 14 | 10 | 186 | 64.4 | 16 | 14 | 210 | 29.0 |
| 18 | 12 | 240 | 52.5 | 20 | 16 | 264 | 26.6 |
| 22 | 14 | 294 | 43.5 | 24 | 18 | 318 | 21.0 |
| 26 | 16 | 348 | 33.1 | 28 | 20 | 372 | 20.6 |
| 30 | 18 | 402 | 22.2 | 32 | 22 | 426 | 17.3 |
| 34 | 20 | 456 | 10.9 | 36 | 24 | 480 | 9.6 |
| 38 | 22 | 510 | 3.3 | 40 | 26 | 534 | 3.8 |

*Mass/charge in elementary units.

In addition to these peaks a fairly prominent peak was found for $m/e=219$.

The series $C_yH_{2y-8}$, $_{-10}$, $_{-12}$, $_{-14}$ ... is what one would expect from polyalkenyl benzenes,

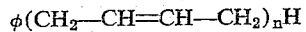

while the series $C_yH_{2y-14}$, $_{-16}$, $_{-18}$, $_{-20}$ ... is what one would expect from polybutadiene molecules having alkylated two benzene molecules, e.g.,

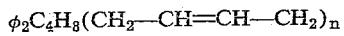

M.S. analysis of a sample hydrogenated with a $PtO_2$ catalyst at 250° C. and 1800 p.s.i.g. hydrogen pressure for 16 hours confirmed that these two types of product were responsible for the two M.S. series as shown in Tables IV and V.

TABLE IV.—M.S. COMPARISON OF SERIES $C_yH_{2y-8}$, $_{10}$, $_{-12}$ BEFORE AND AFTER HYDROGENATION

| Before Hydrogenation | | | | After Hydrogenation | | | |
|---|---|---|---|---|---|---|---|
| $C_yH_{2y-x}$ | | m/e | Number of Alkenyl bonds | $C_yH_{2y-x}$ | | m/e | Number of Alkenyl Bonds |
| y | x | | | y | x | | |
| 10 | 8 | 132 | 1 | 10 | 6 | 134 | 0 |
| 14 | 10 | 186 | 2 | 14 | 6 | 190 | 0 |
| 18 | 12 | 240 | 3 | 18 | 6 | 246 | 0 |
| 22 | 14 | 294 | 4 | 22 | 6 | 302 | 0 |
| 26 | 16 | 348 | 5 | 26 | 6 | 358 | 0 |
| 30 | 18 | 402 | 6 | 30 | 6 | 414 | 0 |

TABLE IV.—M.S. COMPARISON OF SERIES $C_yH_{2y-14}$, $_{-16}$, $_{-18}$ BEFORE AND AFTER HYDROGENATION

| Before Hydrogenation | | | | After Hydrogenation | | | |
|---|---|---|---|---|---|---|---|
| $C_yH_{2y-x}$ | | m/e | Number of Alkenyl bonds | $C_yH_{2y-x}$ | | m/e | Number of Alkenyl Bonds |
| y | x | | | y | x | | |
| 16 | 14 | 210 | 0 | 16 | 14 | 210 | 0 |
| 20 | 16 | 264 | 1 | 20 | 14 | 266 | 0 |
| 24 | 18 | 318 | 2 | 24 | 14 | 322 | 0 |
| 28 | 20 | 372 | 3 | 28 | 14 | 378 | 0 |

The shift data recorded in Table IV are those which will be obtained if the polyalkenyl chains in polyalkenyl benzene are selectively hydrogenated, while the shift data recorded in Table V are those which will be obtained if the polyalkenyl chains in the polymeric material containing two benzene rings are selectively hydrogenated.

The compound of mass number 219 was undoubtedly the PBN oxidation inhibitor. Its mass was changed to 223 during the hydrogenation.

Calculation of the relative amounts of polyalkenyl aromatics containing one and two aromatic rings was difficult, but an estimate could be made by comparing the peak heights obtained for the hydrogenated sample with specific sensitivity data for Ziegler type 1-phenyl alkanes. Such a comparison indicated that the mononuclear polyalkenyl benzenes comprised about 80% of the volatile material. It is possible, of course that some cross-linking occurred during the heating in the mass spectrometer and that the original sample contained a higher percentage of mononuclear polyalkenyl benzenes.

The polyalkenyl benzenes obtained in Runs 1 to 4 were all tested as surface coatings. They were somewhat on the viscous side for solventless applications, but when used as 70% solutions in hydrocarbon solvents they gave easily workable viscosities and yielded surface coatings of attractive properties.

EXAMPLE 2

A series of experiments involving 1,3-butadiene and benzene were carried out as described in Example 1 but with chromic chloride based catalysts.

TABLE VI.—BUTADIENE POLYMERIZATION WITH CrCl₃ CONTAINING CATALYSTS

[1 Liter soda king bottles on paddle wheel stirrer; 100 g. 1,3-butadiene 500 ml. benzene]

| Run | 7 | 8 | 9 |
|---|---|---|---|
| Catalyst: | | | |
| CrCl₃, g.ª | 0.396 | 0.396 | 0.396 |
| Aluminum Alkyl: | | | |
| Type | AlEtCl₂ | AlEt₂Cl | AlEt₃ |
| Weight, g | 0.635 | 0.602 | 0.86 |
| Al/Cr Molar Ratio | 2 | 2 | 3 |
| Reaction Conditions: | | | |
| Temperature, °C | 25 | 25 | 50 |
| Run Length, hrs | 48 | 48 | 72 |
| Results: | | | |
| Total Yield of Products, g | 45.0 | 0.7 | 70.2 |
| Insoluble Products, gᵇ | 8.6 | ᶜ 0.1 | 2.6 |
| Dimers and Trimers, g | 0.1 | 0 | ᵈ 38.7 |
| Distillation Bottoms, g | 36.3 | 0.6 | 28.9 |
| Mol. Wt. of Distillation Bottoms ᵉ | 526 | | 691 |

ª Ball milled 6 days.
ᵇ After addition of 2 volumes of isopropanol.
ᶜ Probably consisted largely of CrCl₃ and chromium organic compounds as indicated by its violet color.
ᵈ Mixture of 1,5,9-cyclododecatrienes containing about 65% of the all-trans form.
ᵉ Number average molecular weight determined by a vapor pressure osmometer.

From the data presented in Table VI it can be readily seen that the CrCl₃-AlEtCl₂ catalyst gave a good yield of polyalkenyl benzene, while the CrCl₃-AlEt₃ catalyst yielded primarily a mixture of 1,5,9-cyclododecatrienes. The CrCl₃-AlEt₂Cl catalyst yielded essentially no polymers under these conditions. It should be noted, however, that the polymerization temperature was only 25° C. A considerably higher yield of polyalkenyl benzene would probably have been obtained at a higher temperature, e.g., 50 to 60° C., although it would still have been considerably inferior to that obtained with AlEtCl₂ containing catalyst systems.

EXAMPLE 3

A polymerization experiment involving 1,3-butadiene and benzene was carried out with a catalyst consisting of 0.73 gram CrBr₃ and 1.62 grams AlEtBr₂. The polymerization was carried out at 60° C. for 48 hours, according to the method described in Example 1. Upon recovery two products were obtained. The first one, weighing 33.3 grams, consisted of a solid resinous hydrocarbon soluble polymer containing both butadiene and benzene units. Its number average molecular weight was 2400. The second product, weighing 46.8 grams, was liquid at room temperature and consisted essentially of polyalkenyl benzene having 6.0% vinyl and 32.6% Type II trans unsaturation. Its number average molecular weight was 611.

Further advantages of this invention will be apparent to those skilled in the art. Polymers of diolefins and mononuclear aromatic compounds or Tetralin can be conveniently and efficiently prepared with the process of the present invention. It is to be understood that this invention is not limited to the specific examples set forth herein, which have been offered merely as illustrations and that modifications may be made without departing from the spirit and scope of the appended claims.

What is claimed is:

1. A process for the formation of polyalkenyl-aromatic polymers which comprises contacting an aliphatic diolefin having from 4 to 6 carbon atoms and an aromatic compound selected from the group consisting of unsubstituted mononuclear aromatic compounds, $C_1$ to $C_4$ alkyl substituted mononuclear aromatic compounds and tetrahydronaphthalene with a catalyst system comprising a chromium halide compound and a lower alkyl aluminum halide compound at polymerization temperatures for a time sufficient to recover a yield of said polymers.

2. The process of claim 1 wherein the polymers recovered have a general formula:

$$Ar(P)_nH$$ 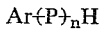

wherein Ar is a radical selected from the group consisting of phenyl radicals, a $C_1$ to $C_4$ alkyl substituted phenyl radical, and a tetrahydronaphthyl radical, $(P)_n$ is a poly(acyclic-diene) composed of repeat units P selected from the group consisting of:

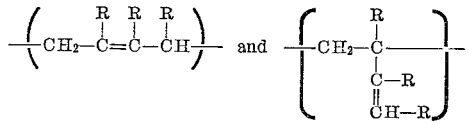

and mixtures thereof wherein R is selected from the group consisting of hydrogen and methyl radicals and mixtures thereof, and $n$ is an integer varying from 2 to 25.

3. The process of claim 1 wherein said chromium halide compound is a chromic halide.

4. The process of claim 3 wherein said lower alkyl aluminum halide compound is an alkyl aluminum dihalide, said alkyl portion of said aluminum compound having from 1 to 6 carbon atoms.

5. The process of claim 2 wherein said chromium halide compound is selected from the group consisting of chromium chlorides, chromium bromides, chromium oxychlorides, and chromium oxybromides and said lower alkyl aluminum halide compound is an alkyl aluminum dihalide, said alkyl portion of said aluminum compound having from 1 to 6 carbon atoms.

6. The process of claim 5 wherein said chromium halide compound is CrCl₃.

7. The process of claim 5 wherein said chromium halide compound is CrBr₃.

8. The process of claim 5 wherein said alkyl aluminum dihalide is selected from the group consisting of ethyl aluminum dichloride and ethyl aluminum dibromide.

9. The process of claim 8 wherein said polymerization reaction is conducted at a temperature in the range of from about 25 to 120° C.

10. The process of claim 9 wherein said aromatic compound is benzene and said diolefin 1,3-butadiene, Ar is a phenyl radical and R is a hydrogen radical.

References Cited

UNITED STATES PATENTS

| 2,824,145 | 2/1958 | McCall et al. | 260—668 XR |
| 3,115,530 | 12/1963 | Cohen | 260—668 |
| 3,284,524 | 11/1966 | Calcagno | 260—668 XR |
| 3,312,748 | 4/1967 | Johnson | 260—671 |

DELBERT E. GANTZ, *Primary Examiner.*

C. R. DAVIS, *Assistant Examiner.*